(Model.)

L. A. RINGWALT.
HARNESS SADDLE TREE.

No. 295,810. Patented Mar. 25, 1884.

Witnesses.
F. W. Lane
A. S. Brown.

Inventor.
Levi A. Ringwalt.
By his Attorney, W. E. Witherbee

United States Patent Office.

LEVI A. RINGWALT, OF WILMINGTON, DELAWARE.

HARNESS-SADDLE TREE.

SPECIFICATION forming part of Letters Patent No. 295,810, dated March 25, 1884.

Application filed October 29, 1883. (Model.)

*To all whom it may concern:*

Be it known that I, LEVI A. RINGWALT, a citizen of the United States, residing at Wilmington, in the county of New Castle and State of Delaware, have invented certain new and useful Improvements in Harness-Saddle Trees; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention consists, mainly, in making harness-saddle trees preferably out of malleable cast-iron in a single piece, and in extending the wings of the tree down on each side to nearly the full length of the completed saddle; and it consists, further, in minor details of construction, which will be hereinafter more specifically set forth.

Figure 1:
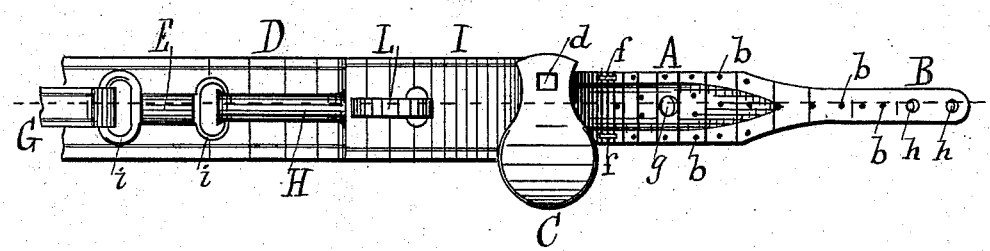
Figure 2:
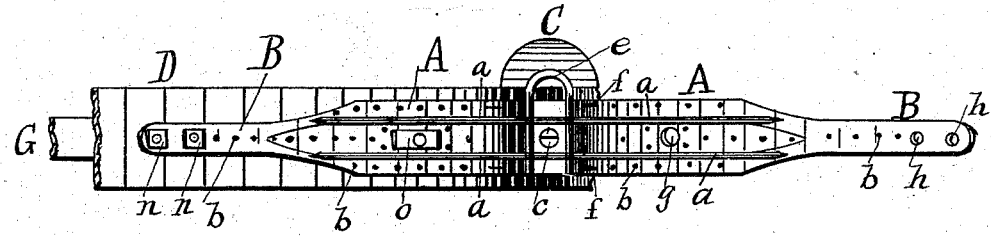
Figure 3:
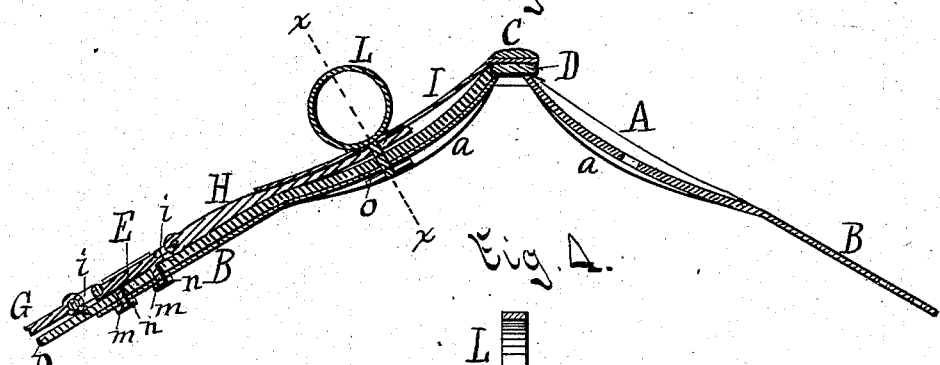
Figure 4:
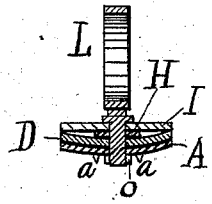

In the accompanying drawings, Figure 1 is a top view of my improved saddle-tree, one-half of it being shown as made up. Fig. 2 is a bottom or under side view of the same. Fig. 3 is a central vertical longitudinal section; and Fig. 4, a vertical cross-section taken in a plane indicated by the line $x\ x$, Fig. 3.

Like letters designate corresponding parts in all of the figures.

The wings A A are cast of the usual length and of suitable width, and are extended to form skirt-stiffeners B B on each side. These extensions are much narrower than the main parts A A of the wings, as shown, and the tree being made of malleable iron, they are quite flexible, and may be bent to fit any size or shape of horse. These skirt-stiffeners extend down nearly the entire length of the tree when made up, and furnish all the stiffening that is needed. The wings A A are hollowed out in the process of casting on the upper side, as shown, and on the lower side are formed with longitudinally-extending ribs $a\ a$. This construction of the wings gives the greatest amount of strength with the smallest amount of material. The upper outline of the wings and points is smooth throughout the entire length of the tree, so that the skirt may be put on without any skiving or cutting out to make it fit the tree, thus economizing greatly in time labor, and expense. The tree is cast with suitable nail-holes, $b\ b$, with proper holes or openings, $c$ and $d$, for the attachment of the saddle-seat C and the check-loop bolt, with a crupper-loop, $e$, with holes $f\ f$ for the tuft-nails, with terret-holes $g\ g$, and special holes $h\ h$ at the lower ends of the points B B. The arch of the tree is of proper shape, so as not to rest on the backbone of the horse; and the tree is finished by japanning before being made up.

The tree is made up as follows: First, the skirt D is secured to the tree by nails driven through the small holes $b\ b$, which are formed in the skirt-stiffening extensions as well as in the wings A A. A double metallic back-band loop, E, having loops $i\ i$ at each end and spuds $m\ m$ on the under side, is then put in place, the spuds $m\ m$ being passed through the skirt and the holes $h\ h$ in the skirt-extensions, and secured thereto by nuts $n\ n$. To one of the loops $i$ the back-band G is attached, and to the other loop a strap, H, is attached, which extends upward beyond the terret-hole $g$. The jockey I is then put in place, being held by the tuft-nails which pass through the skirt and the holes $f\ f$, and by the terret L, which extends through the jockey, strap H, skirt, and terret-hole $g$, and is held securely in place by the nut $o$. The jockey is then stitched to the skirt. It is to be noted that the strap H is held by the shank of the terret, thus relieving the skirt-extension B from the strain of the back-band G. It is also to be noted that the jockey ends where the hollowed portion of the wing A begins, so that the part of the strap H which passes under the jockey enters down into this hollow, thus making the surface of the jockey flush. The ribs $a\ a$ on the bottom of the wings also serve to prevent the nuts $o$ from turning. The saddle-seat and check-loop bolt are then put into position, and the tree is properly padded, and the saddle is completed.

For the larger sizes of trees, the holes $h\ h$ for the loop-spuds are omitted, as for these trees the back-band is attached by a D.

I am aware of the patents granted to Cahoone for harness-saddle trees on May 28, 1878 and October 7, 1879, numbered, respectively, 204,195 and 220,273, and I do not claim any features shown or described in said patents; but What I do claim as my invention is—

As an improved article of manufacture, a harness-saddle tree composed of wings and skirt-stiffening projections, all formed of a single piece, said wings being hollowed out, as shown, on the upper side, for the purpose set forth, and formed with longitudinally-extending ribs, as shown, on the under side, substantially as set forth.

In testimony whereof I affix my signature in presence of two witnesses.

LEVI A. RINGWALT.

Witnesses:
HENRY C. CONRAD,
WM. W. PUTCHETT.